US010552819B1

(12) United States Patent
Gupta et al.

(10) Patent No.: US 10,552,819 B1
(45) Date of Patent: Feb. 4, 2020

(54) MEDIA ENHANCED MOBILE PAYMENTS

(75) Inventors: Diwakar Gupta, Seattle, WA (US);
Chih-Jen Huang, Kirkland, WA (US);
Gerald Yuen, Pasadena, CA (US);
Philip Yuen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1738 days.

(21) Appl. No.: 12/246,667

(22) Filed: Oct. 7, 2008

(51) Int. Cl.
*G06Q 20/32* (2012.01)

(52) U.S. Cl.
CPC .................. *G06Q 20/32* (2013.01)

(58) Field of Classification Search
CPC ............. G06Q 20/3223; G06Q 20/32; G06Q 20/3221; G06Q 20/3278
USPC .......................................................... 705/42
See application file for complete search history.

(56) References Cited

U.S. PATENT DOCUMENTS

| 5,437,478 | A | * | 8/1995 | Gaines | B42D 15/045 |
| | | | | | 283/116 |
| 5,483,580 | A | * | 1/1996 | Brandman | H04M 3/5307 |
| | | | | | 358/402 |
| 5,828,732 | A | * | 10/1998 | Gow | H04M 3/533 |
| | | | | | 379/88.25 |
| 6,181,780 | B1 | * | 1/2001 | Finnigan | H04M 3/533 |
| | | | | | 379/67.1 |
| 6,215,859 | B1 | * | 4/2001 | Hanson | H04M 3/533 |
| | | | | | 379/88.12 |
| 7,376,702 | B2 | * | 5/2008 | DeSalvo | H04L 29/06 |
| | | | | | 370/392 |
| 8,761,355 | B2 | * | 6/2014 | Reding | H04M 3/42221 |
| | | | | | 379/211.01 |
| 2002/0032752 | A1 | * | 3/2002 | Gold | G06Q 30/02 |
| | | | | | 709/218 |
| 2004/0099718 | A1 | * | 5/2004 | Kleinhans | B42D 15/045 |
| | | | | | 229/92.8 |
| 2005/0129191 | A1 | * | 6/2005 | Kokko et al. | 379/88.13 |
| 2006/0134591 | A1 | * | 6/2006 | Karat | B42D 15/022 |
| | | | | | 434/308 |
| 2006/0256934 | A1 | * | 11/2006 | Mazor | H04M 1/7255 |
| | | | | | 379/88.01 |
| 2007/0203836 | A1 | * | 8/2007 | Dodin | G06Q 20/02 |
| | | | | | 705/44 |
| 2007/0233615 | A1 | * | 10/2007 | Tumminaro | G06Q 20/12 |
| | | | | | 705/75 |
| 2007/0275740 | A1 | * | 11/2007 | Deutsch | H04L 12/583 |
| | | | | | 455/466 |
| 2008/0287095 | A1 | * | 11/2008 | Pousti | 455/406 |

(Continued)

FOREIGN PATENT DOCUMENTS

WO    WO-9637067 A1 * 11/1996 ............ H04M 3/533

*Primary Examiner* — William E Rankins
(74) *Attorney, Agent, or Firm* — Lee & Hayes, P.C.

(57) ABSTRACT

Media enhanced mobile payments enable a user to make payments and payment requests that include additional media. The user may transmit a text-based message that may be used to update an account associated with a recipient. Additional media, such as a personalized voice recording, may be acquired by a host from the user, and may be associated with the text-based message. The additional media may be transmitted to the recipient identified in the text-based message. In some aspects, the text-based message may be a short messaging service (SMS) text message. Further aspects may include the host connecting to the user via a telephone call to record the personalized voice recording.

25 Claims, 10 Drawing Sheets

(56) References Cited

U.S. PATENT DOCUMENTS

| | | | |
|---|---|---|---|
| 2009/0161839 A1* | 6/2009 | Neumann | H04L 51/34 |
| | | | 379/88.18 |
| 2009/0259474 A1* | 10/2009 | Lien | B42D 15/022 |
| | | | 704/272 |
| 2010/0012714 A1* | 1/2010 | Weesner | G06Q 20/06 |
| | | | 235/375 |
| 2011/0119967 A1* | 5/2011 | Kawesch | B42D 15/022 |
| | | | 40/124.03 |
| 2012/0190386 A1* | 7/2012 | Anderson | G01C 15/04 |
| | | | 455/456.3 |

\* cited by examiner

MEDIA ENHANCED MOBILE PAYMENTS

BACKGROUND

Traditional methods of conducting financial transactions commonly consist of an exchange of currency, which may include paper currency, checks, credit cards, and electronic transfers. With each type of currency, a number of processes are typically necessary to fulfill a transaction. The processes may include a payment fulfillment process, paperwork, and processes performed by a banking institution, among other possible processes.

In more recent years, financial transactions have moved online onto the Internet, a worldwide system of computer networks. It is commonplace for entities to transfer payments across the Internet to complete a transaction. In addition to the Internet, other electronic forms of communication enable payment transmission, such as mobile telephony using wired and wireless communications.

Voice messaging is a convenient way to leave messages for a recipient without spending additional time typing or formatting a text-based communication. In addition, voice messaging may provide a personal connection between a user that recorded the message and a recipient, such as when the user has a familiar voice. Finally, voice recording enables the user to leave audio messages that may not be properly or accurately conveyed using stand-alone text, such as voice messages including a song, non-standard words, or other sounds that are difficult or impossible to convey with text.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 9A shows a UI to send or request a payment that includes a media acquisition link, and where FIG. 9B shows a UI of a message including a media link.

DETAILED DESCRIPTION

Overview

This disclosure is directed to techniques and systems for providing media enhanced mobile payments that may enable a user to enter into transactions with other users or entities via a mobile network. The user may transmit a text-based message and additional media to a recipient, via an intermediary party such as a host. The additional media may include, without limitation, a voice recording, a music clip, other types of audio, video, and/or images. In some embodiments, the additional media may be personalized media created by the user. For example, the user may send a recipient a gift card by transmitting an electronic message to a retailer. The retailer may enable the user to include a personalized voice message that may be delivered to the recipient upon delivery of the gift card. In some embodiments, the gift card, or another gifted, purchased, or requested element of the user may be delivered to the recipient electronically, such as by modifying an account associated with the recipient. As used herein, the term "payment" includes any requested transfer of funds, money, credits, or elements (e.g., products or services).

The techniques and systems described herein may be implemented in a number of ways. Example implementations are provided below with reference to the following figures.

Figure 1:
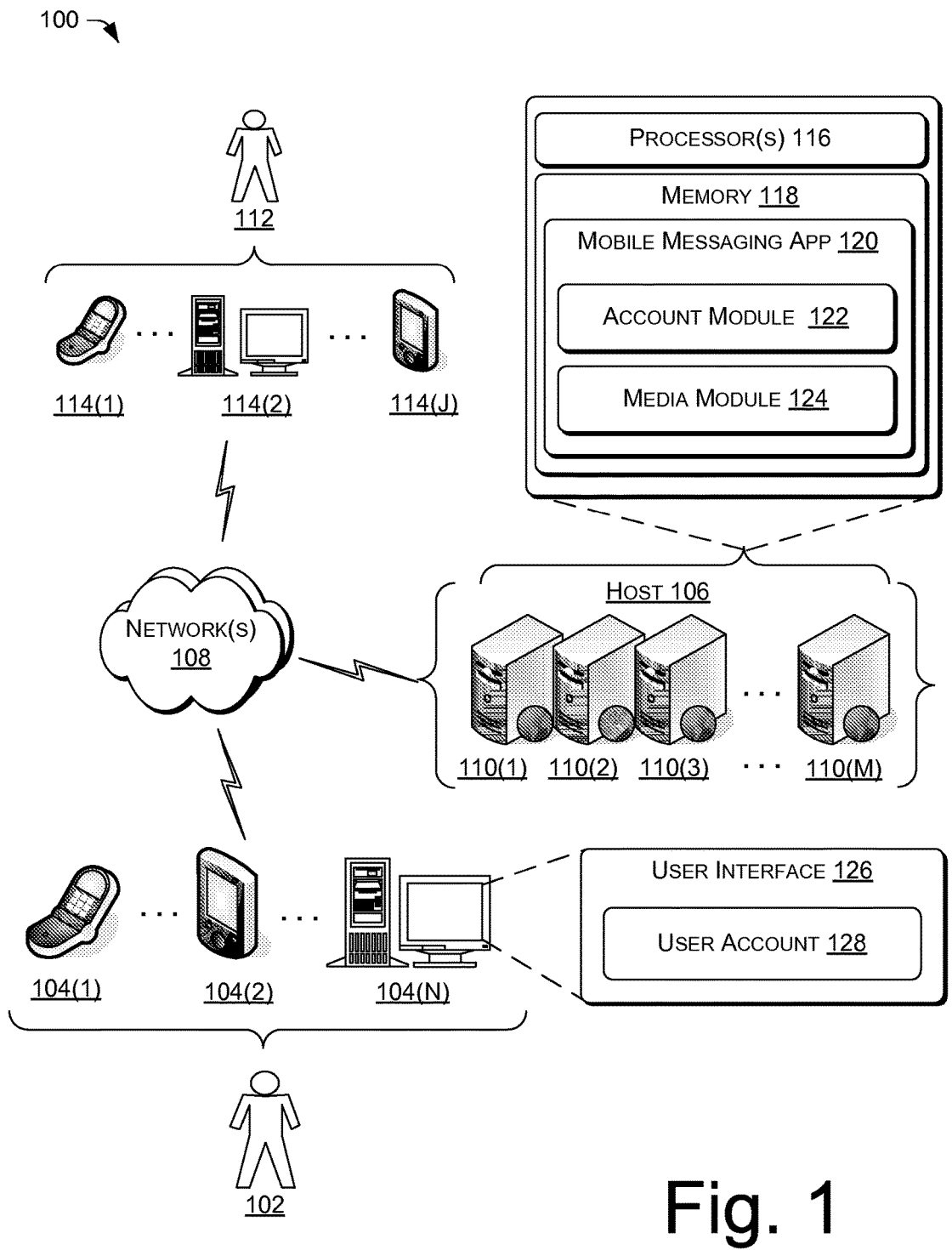
FIG. 1 shows an illustrative computing environment for providing a media enhanced mobile payment.

FIG. 1 shows an illustrative computing environment for providing a media enhanced mobile payment. A user 102 is associated with one or more client computing devices ("client devices") 104(1), . . . , 104(N) that access a host 106 via a network 108. The network 108 is representative of many different types of networks, such as cable networks, the Internet, local area networks, mobile telephone networks, wide area networks and wireless networks, or a combination of such networks.

The host 106 may be hosted on one or more servers 110(1), . . . , 110(M), perhaps arranged as a server farm. Other server architectures may also be used to implement the host 106. The host 106 is capable of handling requests from many users and serving, in response, various information and data to the client devices 104(1)-(N). The servers 110(1)-(M) include mobile payment servers capable of facilitating interaction by the client devices 104(1)-(N) between the user 102 and a user account via the network 108. In this manner, the host 106 is representative of essentially any site supporting user interaction, including online ecommerce payment services, and so forth.

The client devices 104(1)-(N) may be implemented in any number of ways. In FIG. 1, the devices are illustrated as a wireless telephone 104(1), a portable digital assistant (PDA) 104(2), and a personal computer 104(N). But, other example implementations include a television set-top box, a game console, a portable gaming device, a digital video recorder, a portable computer, electronic book readers, and other electronic or entertainment devices. The client devices 104(1)-(N) may include integrated media capture hardware and/or software, such as a camera, a voice recorder, and so forth. For example, the wireless telephone 104(1) may include a camera for capturing an image or video, software to record a personalized message, etc.

The user employs the client device 104(1)-(N) to interact with the user account residing on the host 106. In one scenario, the client device 104(1)-(N) sends a request to the servers 110(1)-(M). The request may be a uniform resource identifier (URI) request, a short message service (SMS) message, a multimedia messaging service (MMS) message, mobile instant messaging (MIM), e-mail, or other types of requests. Upon receiving the request, the servers may return a page (or other communication) to a requesting client device 104(1)-(N), allowing the user to interact with the data provided by the servers. For example, a returned page may include links that enable the client device to request information related to the user account. In addition or alternatively, the returned page may include links that enable the client device 104(1)-(N) to engage in transactions with an entity 112. The entity 112 may be a person, as illustrated in FIG. 1 or it could be a business, organization, and so forth. The entity 112 may be associated with entity computing devices 114(1), . . . , 114(J) to enable interaction with the host 106 and/or the user 102 via the network 108.

Other user interfaces, such as dedicated applications implemented using software instructions and stored locally on or remotely to the client device 104(1)-(N), may be used to interact with the host 106. Further, the client device 104(1)-(N) may use short text commands, such as short message service (SMS) text messages to communicate with the host 106.

As illustrated, the servers 110(1)-(M) are equipped with one or more processors 116 and memory 118. The memory 118 may include applications, modules, and/or data. In some embodiments, the memory 118 may include a mobile messaging application 120, which may facilitate media enhanced mobile payments for use by the user 102. For instance, the mobile messaging application 120 may enable the user 102 to make payments, authorize payments, request payments, and interact with a transaction account, among other possible actions related to the user account. In addition, the mobile messaging application 120 may enable the user 102 to transmit media, such as audio, video, or images to enhance the payment message. For example, a user 102 may wish to engage in a payment transaction with the entity 112 (e.g., a business). The mobile payment application 120 may enable the user 102 to transmit a payment to the business and may enable the user to personalize the payment message by adding a personal voice message, a picture, a video, or other additional media that may be transmitted to the entity 112. As discussed herein, a payment may include a transfer of money, credits, points, shares, elements, or any other medium that may be transacted.

The mobile messaging application 120 may include a number of modules such as an account module 122 and a media module 124. The account module 122 may be used to extract information from messages that are received by the user 102 and/or the entity 112. The account module 122 may also verify and approve/deny user account actions initiated by the user 102. For example, the user 102 may initiate a transaction request to transfer a payment from the user account to an account associated with the entity 112. The account module 122 may verify aspects of the requested payment transfer to ensure that the payment was intended, is permissible, and includes the correct recipient, among other possible factors to verify. Further, the account module 122 may perform additional processes, as disclosed herein, which support mobile payments.

In accordance with embodiments, the media module 124 may enable recording or acquiring media from the user 102 or the entity 112. For example, the media module 124 may initiate a recording session on the client device 104(1)-(N) to enable the user 102 to record a personalized voice message for the entity 112. The media module 124 may deliver the media to the recipient, such as the entity 112, and enable playback and/or downloading by the recipient via the entity device 114(1)-(J). Further, the media module 124 may perform additional processes, as disclosed herein, which support mobile payments.

In accordance with one or more embodiments, a client device, such as the client device 104(N), may be equipped with a user interface (UI) 126 to provide access to a user account 128. For example, the user 102 may communicate with the host 106 via the user interface 126 on the client device 104(1)-(N) to interact with the user account 128. The user account 128 may be manipulated by the user 102, either directly or indirectly, using the mobile messaging application 120.

Illustrative Provider Initiated Messaging

Figure 2:
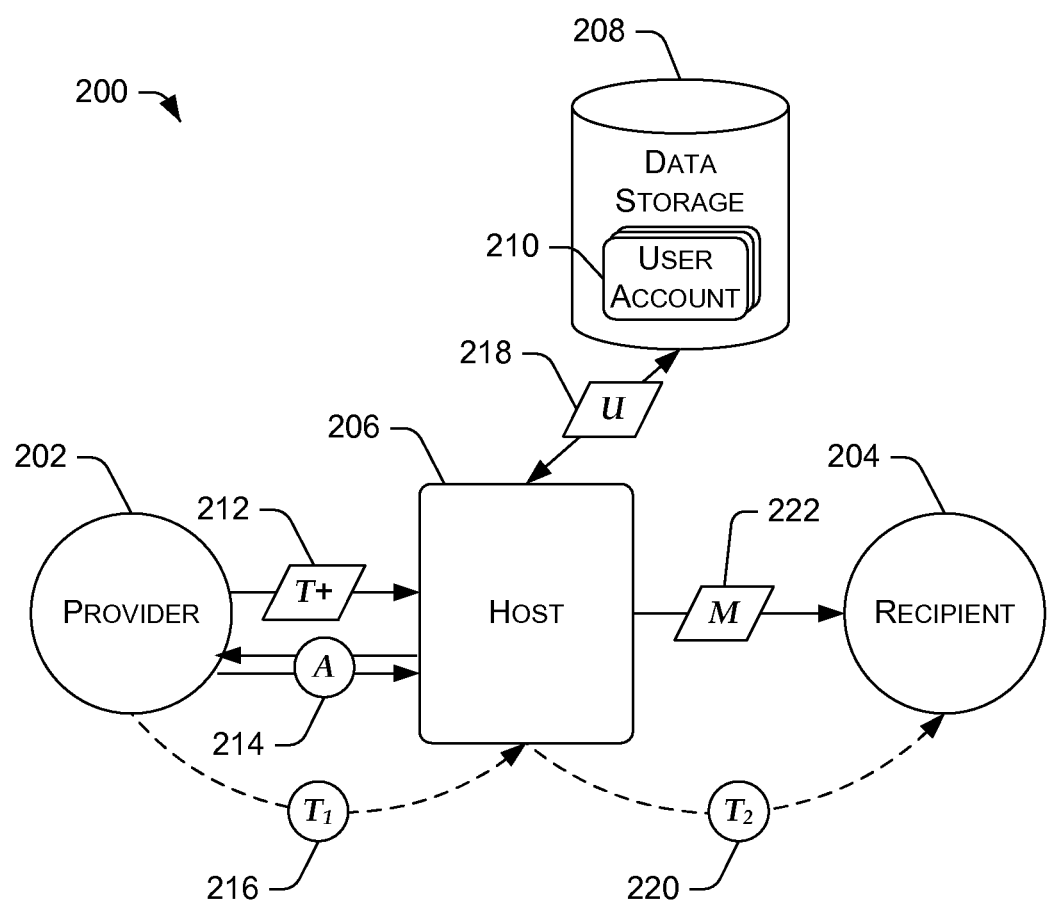
FIG. 2 shows an illustrative schematic of a media enhanced mobile payment including messaging between a provider and a recipient in accordance with some embodiments of the disclosure.

FIG. 2 shows an illustrative schematic of a media enhanced mobile payment service ("service") 200. The service 200 may facilitate messaging and payments between a provider 202 and a recipient 204 via a host 206. The provider 202 may provide a payment, such as money, credits, elements, etc. to the recipient 204 via a transaction. For example, the provider 202 may include the user 102 and client devices 104(1)-(N) of FIG. 1 while the recipient 204 may include the entity 112 and the computing devices 114(1)-(J). The host 206 may be in communication with a data storage 208, which may be used to maintain user accounts 210. In some embodiments, the user account 210 may be a transaction authorization service account as disclosed in U.S. patent application Ser. No. 11/546,534 entitled "Transaction Authorization Service" filed on Oct. 10, 2006. Alternatively or additionally, the user account 210 may be a bank account (e.g., checking or savings account), a credit card, another financial services account, or other type of account configured to manage payments as discussed herein.

In accordance with some embodiments, the provider 202 may transmit a provider message 212 to the host 206. The provider message 212 may originate from a web-interface communication, an email, a telephone service, a short message service (SMS) text message, a multimedia message service (MMS) message, a mobile instant messaging (MIM), or another communication. For example, SMS text commands may be established to enable the provider 202 to transact with the recipient 204 via the host 206. The provider 202 may send an SMS "Pay 20 Joe123" to the host 206 for processing, where "Joe123" is the entity account 210 and "pay 20" is the established command. The established command may initiate a transfer of a payment of 20 units, dollars, etc. to the user account 210 associated with the recipient 204. The provider message 212 may be predetermined or the provider message 212 may comprise an ad hoc transaction request. In another example, the provider 202 may reserve a restaurant, rental car, hotel, or make other arrangements with a recipient 204, by sending the provider message 212 to the host 206.

In accordance with one or more embodiments, the provider 202 and/or the recipient 204 may have accounts, such as a provider account and a recipient account, that are associated with the respective parties. The accounts may include stored information about the respective parties, such as name, address, contact information, telephone number, email, financial information, etc. In this way, the provider 202 may transact with the recipient 204 without providing information that is repetitive, unsecure, or otherwise undesirable to transmit during each transaction.

In some embodiments, the host 206 may transmit an authorization request 214 to the provider 202. For example, when the provider message 212 is initiated using an unsecure communication, such as a SMS text message, the provider message 212 may be verified by the authorization request 214. The authorization request 214 may be communicated to the provider 202 by any type of communication, such as, without limitation, a voice automated message, an email, an SMS message, or any other type of communication.

The user 102 may respond to the authorization request 214 by selecting a command to indicate an approval of the provider message 212. For example, in a mobile telephone communication, an interactive automated voice system may enable the provider 202 to accept or deny the provider message 212 during the authorization request 214. In addition to authorizing the request, the user 102 may also be prompted or required to enter other information to complete the authorization, such as a personal identification number (PIN) or password, which may provide additional security and/or verify the identity of the provider 202.

In some embodiments, the provider 202 may transmit additional media to the host 206 via a first transmission 216, where the additional media is associated with the provider message 212 and intended for distribution (at least in part) to the recipient 204. For example, the additional media of the first transmission 216 may be designated with an identification number (ID) that matches the ID number associated with the provider message 212, thus linking the two communications to one another. The host 206 may provide a cue, such as prompt or other indication to indicate to the provider 202 that he or she may provide additional media, which in turn is received by the host. For example, the cue may be part of an integrated voice messaging service provided by the host 206 that communicates information to the provider 202 regarding how and when to leave a personalized voice recording for the recipient 204.

The additional media of the first transmission 216 may include one or more of audio, video, or images. In one embodiment, the additional media may be a personalized recording by the provider 202 that enhances the provider message 212. For example, the provider 202 may desire to record a personal message for transmission with a gift that is provided by the provider message 212, such as a personal message of "congratulations on your exams, enjoy a night on the town with this fifty bucks." In this example, the provider message 212 may be a SMS including "Pay 50 Tom123". Similarly, the additional media may be a personalized video or image that recites the "congratulations" message above. In another example, the provider 202 may transmit the provider message 212 to a hotel system to reserve a room and attach a personalized voice recording as the first transmission 216 that includes special instructions, such as a request for a room with handicap access, a view of the pool, etc.

In further embodiments, the provider 202 may select existing audio, video, or images. For example, the provider may transmit a music clip, a downloaded video, or other media with the provider message 212. Thus, in such embodiments media may be previously stored on the client device 104 and selected for transmission with the payment transaction. In some embodiments, the provider 202 may obtain existing greetings for transmission to the recipient 204.

The first transmission 216 of the additional media may be transmitted to the host 206, and ultimately to the recipient 204, in a variety of ways. In some embodiments, the additional media may be included in the provider message 212, thus the first transmission 216 may coincide with the provider message 212. For example, when the provider message 212 is an MMS message, an email, a web-interface communication, and so forth, the provider message 212 may include attached additional media, such as audio files, video files, and/or images. In other embodiments, the first transmission 216 may be distinctly different from the transmission of the provider message 212. For example, the host 206 may enable the provider 202 to record a personal message using a telephone calling system. The telephone calling system may, for example, facilitate the media capture at a substantially similar time as the authorization request 214, thus enabling the provider to optionally record a personalized message for the recipient 204 during the authorization request. Additionally or alternatively, the provider 202 may initiate a communication with the host 206 to facilitate transmission of a media recording, such as by including a code in the provider message 212 that signals the host 206 to initiate media retrieval or by initiating a call to a dial-in service, etc., associated with the host 206.

The host 206 may transmit updates 218 to the date storage 208 to update the user accounts 210 or otherwise manipulate data residing in the data storage based on the content of the provider message 212. In some embodiments, the provider message 212 may include multiple pieces of information, such as without limitation, identifiers (pay, transfer, reserve, etc.), values, comments, media, and so forth. The host 206 may parse this information to determine a requested action from the provider 202, and then undertake the requested action by one or more of the updates 218 directed to the user accounts 210 residing in the data storage 208.

In one or more embodiments, the host 206 may transmit the additional media via a second transmission 220 to the recipient. The additional media may be transmitted in the same format as originally received by the host 206 from the provider 202 (e.g., voicemail sent as an .mp3, etc.). Alternatively, the media of the second transmission 220 may be reformatted, compressed, or otherwise modified from the original media (e.g., converted from the .wmf format to the .mp3 format by the host 206, etc.). The second transmission 220 may use the same communication path as the first transmission 216 of media to the host 206, or it may use a different communication path. Illustrative communication paths include, without limitation, a web-interface communication, an email, a telephone service, a SMS text message, an MMS message, or other communication paths.

In some embodiments, the host 206 may transmit a recipient message 222 to the recipient 204. The recipient message 222 may be of the same communication path as the provider message 212, or it may be transmitted by the host 206 using a different communication path. For example, the provider message 212 may be a SMS message and the recipient message 222 may be an email message. In some embodiments, the recipient message 222 and the additional media may be combined in a single transmission from the host 206 to the recipient 204, such as by an email, an MMS message, a web-interface communication, and so forth. Thus, the second transmission 220 may coincide with the recipient message transmission in some embodiments.

Figure 3:
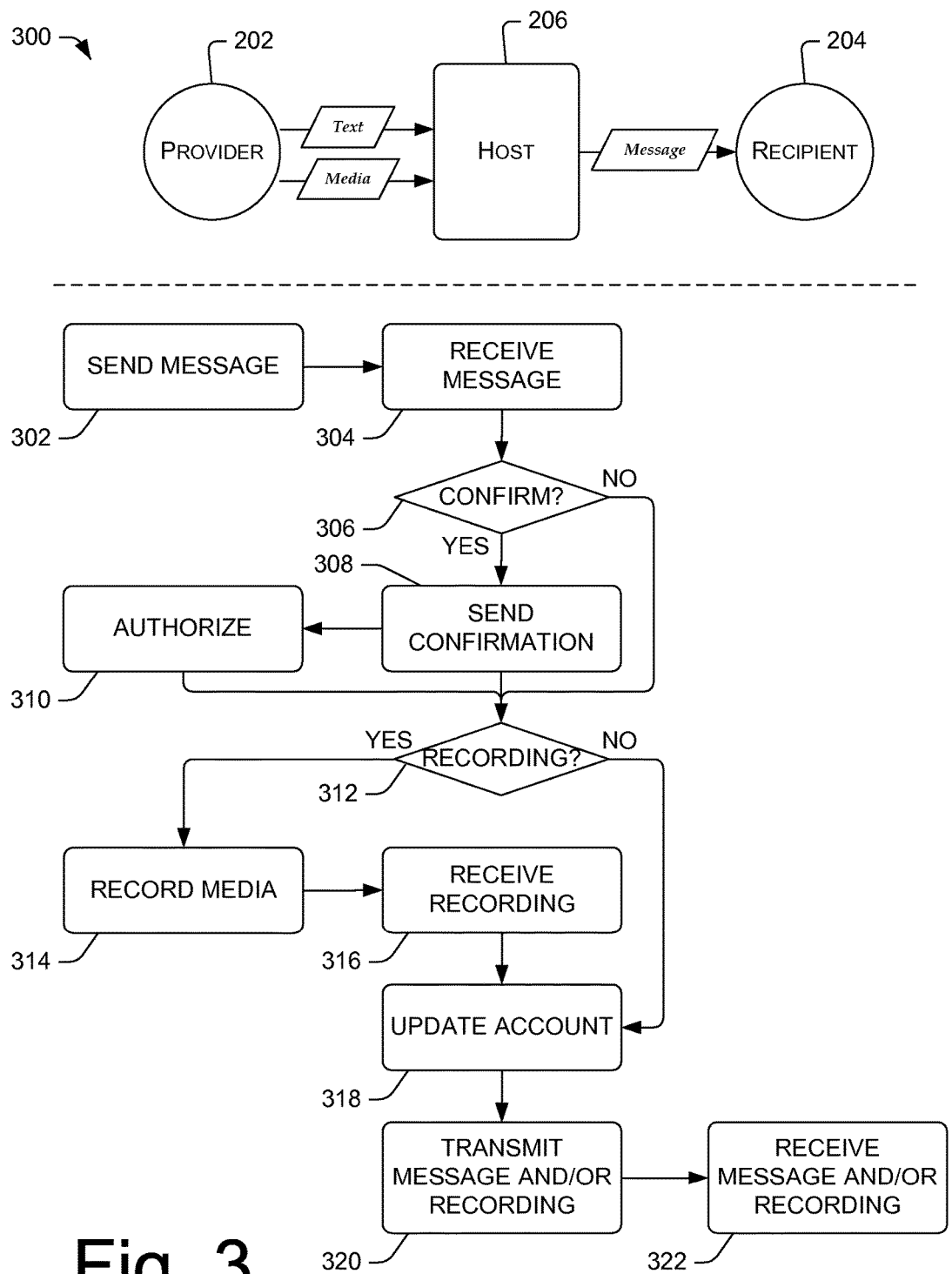
FIG. 3 shows an illustrative flow diagram of a process of updating an account based on a provider message which may be transmitted with a recording.

FIG. 3 shows an illustrative flow diagram of a process 300 of updating an account based on a provider message which may be transmitted with a recording. The process 300 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly.

As shown in FIG. 3, the provider 202 may send a message to the host 206. The message may be a SMS text message or other type of text-based message, including email. In some embodiments, other types of messages may be received, such as voice messages, such as to operate an interactive voice response (IVR) system. The host 206 receives the message at 304.

In some embodiments, the host may confirm the message from the operation 302 using an authorization request beginning at 306. If a confirmation at 306 is warranted (based on predetermined logic, user account settings, and the like), the host sends a confirmation at 308. In one embodiment, the confirmation is a system generated interactive telephone call directed to the provider 202. At 310, the provider 202 may authorize the confirmation such as by inputting data (a code, a password, etc.) or using other commands such as a voice command.

In accordance with one or more embodiments, the host 206 may enable acquisition of a recording from the provider 202 at 312. For example, the host 206 may enable the provider 202 to record media during an automated telephone authorization process, such as by piggybacking on the authorization process of the operations 308-310. The provider 202 may record media at 314, such as by recording a voice message for the recipient 204. At 316, the host 206 may receive the recording and store it for future use or transmit it to the recipient as disclosed below. For example, the recording may be stored, as least temporarily, in the data storage 208 of FIG. 2.

At 318, the host 206 updates an account associated with one or both of the provider 202 and the recipient 204. For example, if the provider 202 is sending the recipient 204 a payment, the user accounts (e.g., the user account 210) of the provider may be debited by the payment value while the user account of the recipient may be credited with the payment value.

The host 206 may transmit the message, or a portion thereof, created at the operation 302 and/or the media recorded at the operation 314 to the provider at 320, which is received by the provider at 322. In some embodiments, the host may convert at least a portion of the message and media to a different communication mode, format, compression, size, or vary other attributes of the message and/or media at the operation 320. For example, the message at 302 may be a SMS text message while the communication at 320 may be an MMS message including both the message of the operation 302 and the recording of the operation 314 in a single communication to the recipient 322.

Figure 4:
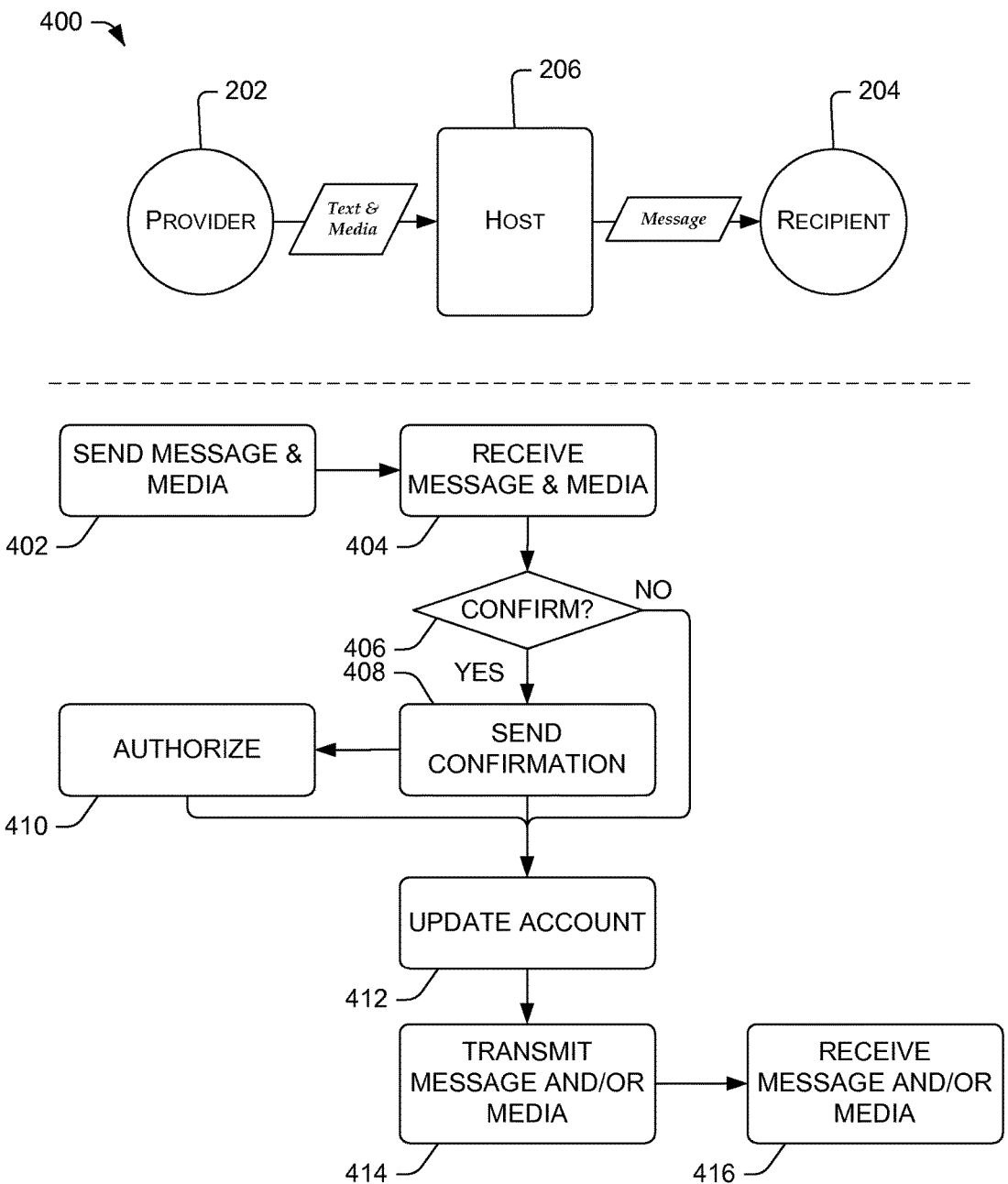
FIG. 4 shows an illustrative flow diagram of a process of a provider transmitting a message and media to a recipient and updating an account.

FIG. 4 shows an illustrative flow diagram of a process 400 of a provider transmitting a message and media to a recipient and updating an account. As discussed above with reference to the process 300, any number of the described blocks can be combined in any order and/or in parallel to implement the process 400.

At 402, the provider 202 sends a message and media to the host 206. The message and media may be transmitted by any communication that enables transmission of text and other media, such as an audio file, a video file, an image file, or other media. For example, the message and media may be transmitted by an email, an MMS message, a web interface communication, and so forth. At 404, the host 206 receives the message and media.

In some embodiments, the host 206 may confirm the message and/or media from the provider 202 using an authorization process that may begin at 406. When the message and media sent from the provider 202 at the operation 402 is transmitted by an unsecure transmission, such as an MMS message, unsecure email, or the like, the host 206 may send a confirmation request at 408 to verify the authenticity of the message and/or media. In one or more embodiments, the confirmation at the operation 408 may be conducted using a different communication path than the communication path used to transmit the message and media. For example, if the operation 402 occurs using an MMS message, the confirmation at 408 may be a telephone call requiring using input, among other possible alternative communications. At 410, the provider 202 may authorize the message to continue the process 400.

At 412, the host 206 updates an account (e.g., the user account 210) associated with provider 202 and/or the recipient 204. The host 206 may transmit the message and media, or a portion thereof, received at the operation 404 to the provider at 414. Similar to the operation 320 of FIG. 3, the operation 414 may include transmission of a communication using a different communication path that that used to send the message and media at the operation 402. At 416, the recipient 204 may receive the message and/or media, or a portion of the message and/or media.

Illustrative Recipient Initiated Messaging

Figure 5:
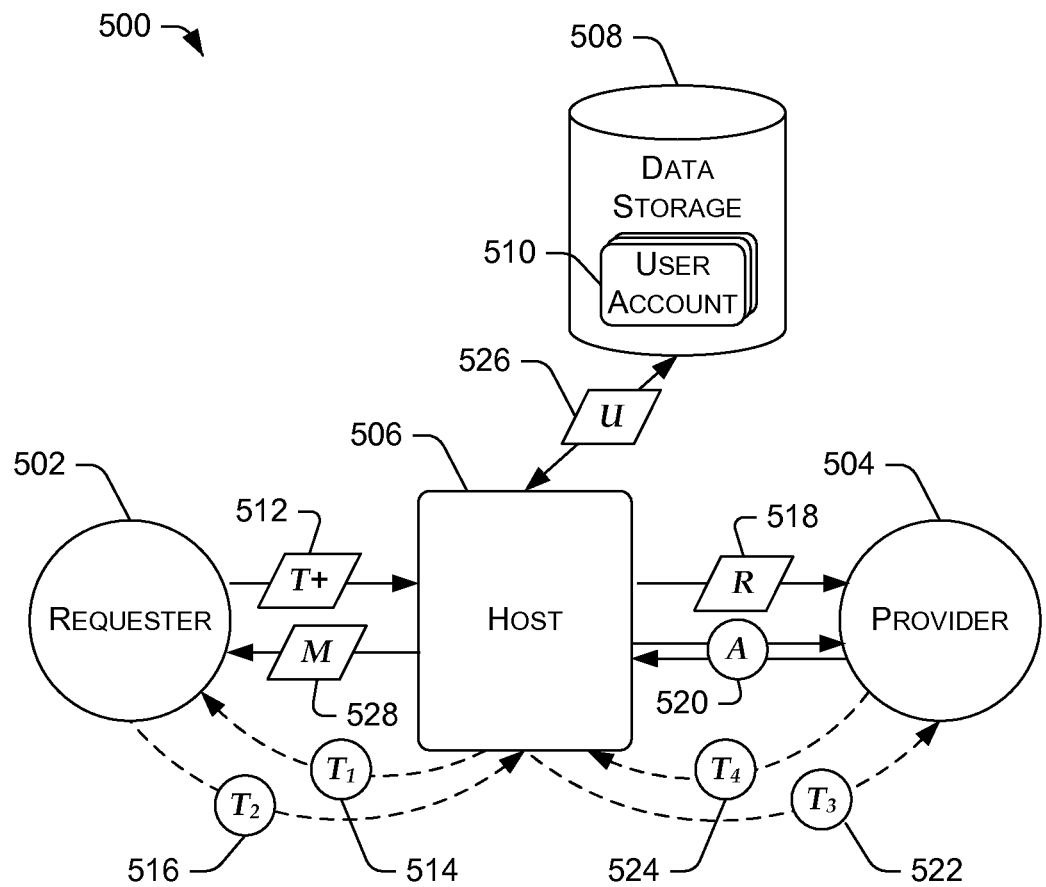
FIG. 5 shows an illustrative schematic of a media enhanced mobile payment including messaging initiated by a requester that is directed to a provider in accordance with some embodiments of the disclosure.

FIG. 5 shows an illustrative schematic of a media enhanced mobile payment request service ("request service") 500. The request service 500 may facilitate messaging initiated by a requester 502 that is directed to a provider 504 via a host 506. The host 506 may be in communication with a data storage 508 for storing and maintaining user accounts 510. In some embodiments, the user account 510 may be a transaction authorization service account as disclosed in U.S. patent application Ser. No. 11/546,534 entitled "Transaction Authorization Service" filed on Oct. 10, 2006. In contrast to the service 200, the request service 500 may enable the requester 502 to request a payment from the provider 504, who in turn may authorize the requested payment to create a bidirectional communication between the requester and the provider.

In accordance with one or more embodiments, the requester 502 may transmit a requester message 512 to the host 506. The requester message 512 may originate from a web-interface communication, an email, a telephone service, a SMS text message, an MMS message, a MIM message, or another communication. For example, SMS text commands may be established to enable the requester 502 to request a payment from the provider 504 via the host 506. For example, the requester message 512 may send an SMS "Request 10 Dave567" to the host 506 for processing, where "Dave567" is the user account 510 and "Request 10" is the established command to request a payment of 10 units, dollars, etc. from the provider 504 to the user account 510 associated with the requester message 512. The requester message 512 may be predetermined or the message 512 may comprise an ad hoc transaction request. In another example, the requester message 512 may request other elements (products, services, etc.), such as a restaurant reservation, rental car, hotel, or may make other requests from the provider 504.

In some embodiments, the requester 502 may be enabled to transmit additional media to the host 506 for transmission to the provider 504. For example, the requester 502 may desire to include special instructions, a personalized message, an image, or other additional media in a communication. In some embodiments, the host 506 may facilitate acquisition of the additional media via a first transmission 514. In response to the first transmission 514, or on its own initiative, requester 502 may transmit additional media to the host 506 via a second transmission 516. Therefore, in some embodiments, the second transaction 516 may occur without the first transaction 514. In an example, the first transaction 514 may be telephone call from the host 506 to the requester 502 to enable the requester to record a personalized voice message for transmission to the provider 504. In another example, the second transmission 516 may piggyback on the message 512, such as by including a message and additional media in an email, an MMS message, and so forth, making the first transmission 514 unnecessary.

The host 506 may transmit a request 518 to the provider 504, which may include the requester message 512, or a portion thereof, and/or the media of the second transmission 516. The provider 504 may then authorize the request 518 via an authorization 520. In some embodiments, the authorization 520 may include bidirectional communication with the host 506 to confirm the authorization.

In some embodiments, the provider 504 may include additional media in the authorization, such as a personal message, a recording, an image, and so forth. In some embodiments, the host 506 may facilitate acquisition of the additional media via a third transmission 522. In response to the third transmission 522, or on its own initiative, provider 504 may transmit additional media to the host 506 via a fourth transmission 524. Therefore, in some embodiments, the fourth transmission 524 may occur without the third transmission 522. In an example, the third transmission 522 may piggyback on a confirmation communication which is included in the authorization 520, such as a telephone authorization call where the third transmission 522 enables the provider 504 to record a personalized voice message at the fourth transmission 524, which is ultimately communicated to the requester 502 via the host 506.

The host 506 may transmit updates 526 to the date storage 508 to update the user accounts 510 or otherwise manipulate data residing in the data storage. In some embodiments, the authorization 520 may include multiple pieces of information, such as without limitation, identifiers (pay, transfer, reserve, etc.), values, comments, media, and so forth. In addition or in an alternative, the authorization 520 may include or direct the host 506 to process information from the requester message 512. The host 206 may parse information from the authorization 520 and/or the requester message 512 to determine an authorized action from the provider 504, and then undertake the authorized action by one or more of the updates 526 directed to the user accounts 510 residing in the data storage 508.

The host 506 may transmit a message 528 to the requester, which may include text and/or media, or a portion thereof, such as media from the fourth transmission 524. The message 528 may be communicated using a similar or different communication path than the requester message 512, the request 518, and/or the authorization 520, including but not limited to SMS messaging, MMS messaging, email, telephony, web interface communications, and so forth.

Figure 6:
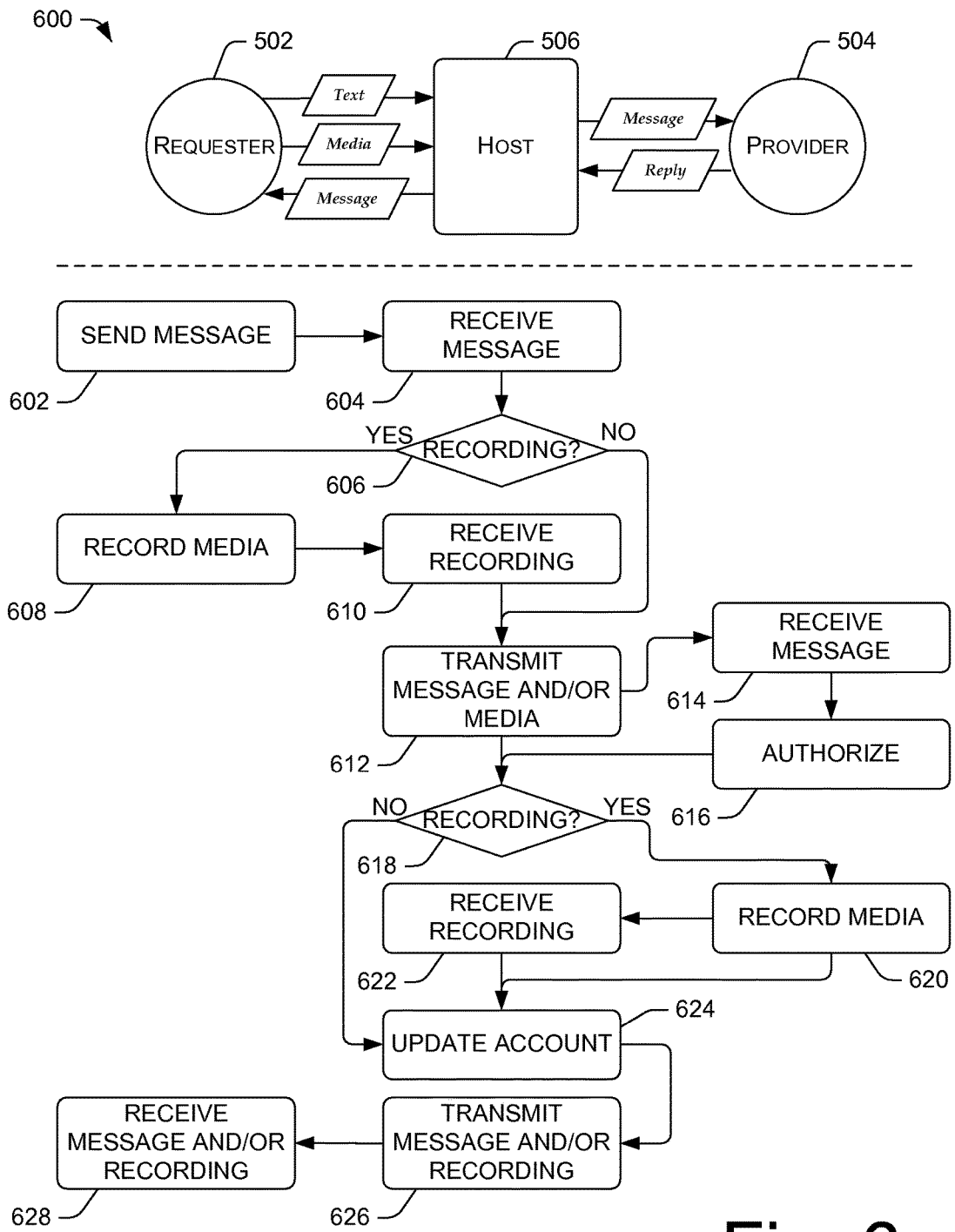
FIG. 6 shows an illustrative flow diagram of a process of updating an account based on a request from a requester and a provider authorization, where the request and authorization may include a recording.

FIG. 6 shows an illustrative flow diagram of a process 600 of updating an account based on a request from a requester and a provider authorization, where the request and/or authorization may include a recording. As discussed above with reference to the process 300, any number of the described blocks can be combined in any order and/or in parallel to implement the process 600. Some of the operations in the process 600 are similar to the operations in the process 300, and thus will not be elaborated in detail. The descriptions, examples, and other support found in the process 300 may equally apply to some of the similar operations of the process 600, particularly the operation of process 600 including the same block titles as the operations in the process 300 such as the operations 302 and 602, which both have block titles that state "send message."

In accordance with some embodiments, at 602 the recipient sends a message to the host 506. The message may be an SMS message or other type of message. The host 506 receives the message at 604. The host 506 may accept a recording from the requester 502 at 606. For example, the host 506 may enable the requester 502 to record media during an automated telephone authorization process. The requester 502 may record media at 608, such as by recording a voice message for the provider 504. At 610, the host 506 may receive the recording and store it for future use or transmit the recording to the provider 504 as discussed below. For example, the recording may be stored, as least temporarily, in the data storage 508 of FIG. 5.

At 612, the host 506 may transmit the message of the operation 602 and/or the media of the operation 608 to the provider 504, which may be received by the provider at 614. The transmission at the operation 612 may require an authorization by the provider 504 to process the request of the requester 502. At 616, the provider 504 may authorize the request of the operation 602. In some embodiments, the operation 614 and 616 may include a confirmation as described with reference to the authorization 520 of FIG. 5, such as when the communication path used in the operation 616 is an unsecure communication.

At 618, the provider 504 may record media for the requester 502, similar to the operation 606. Accordingly, at 620 the provider 504 may record media and at 622 the host 506 may receive the recording, such as to store the recording for future use. At 624, the host 506 updates an account (e.g., the user account 510) associated with one or both of the requester 502 and the provider 504. At 626, the host 206 may transmit the message, or a portion thereof, created at the operation 616 and/or the media recorded at the operation 620 to the requester 502, which is received by the requester at 628.

In an illustrative example, the process 600 may facilitate a user request of an element (e.g., a consumable product or service such as a product for sale on an ecommerce website). A user may transmit the request at the operation 602 such as a SMS text message that states "buy product123xyz for Sam567," where "buy" is a payment command, "product123xyz" is a requested element, and "Sam567" is the provider. At the operation 608, the user may record a message for Sam567 such as "Dad, I need this thing for school, please authorize this purchase right away . . . . Thanks!" At the operation 620, Sam567 (i.e., "Dad") may leave a personalized voice message for the user. The operation 624 may include deducting a payment value from the account associated with Sam567 and may initiate a process of fulfilling the element request by the user, such as initiating shipment of the element to the user's home.

Figure 7:
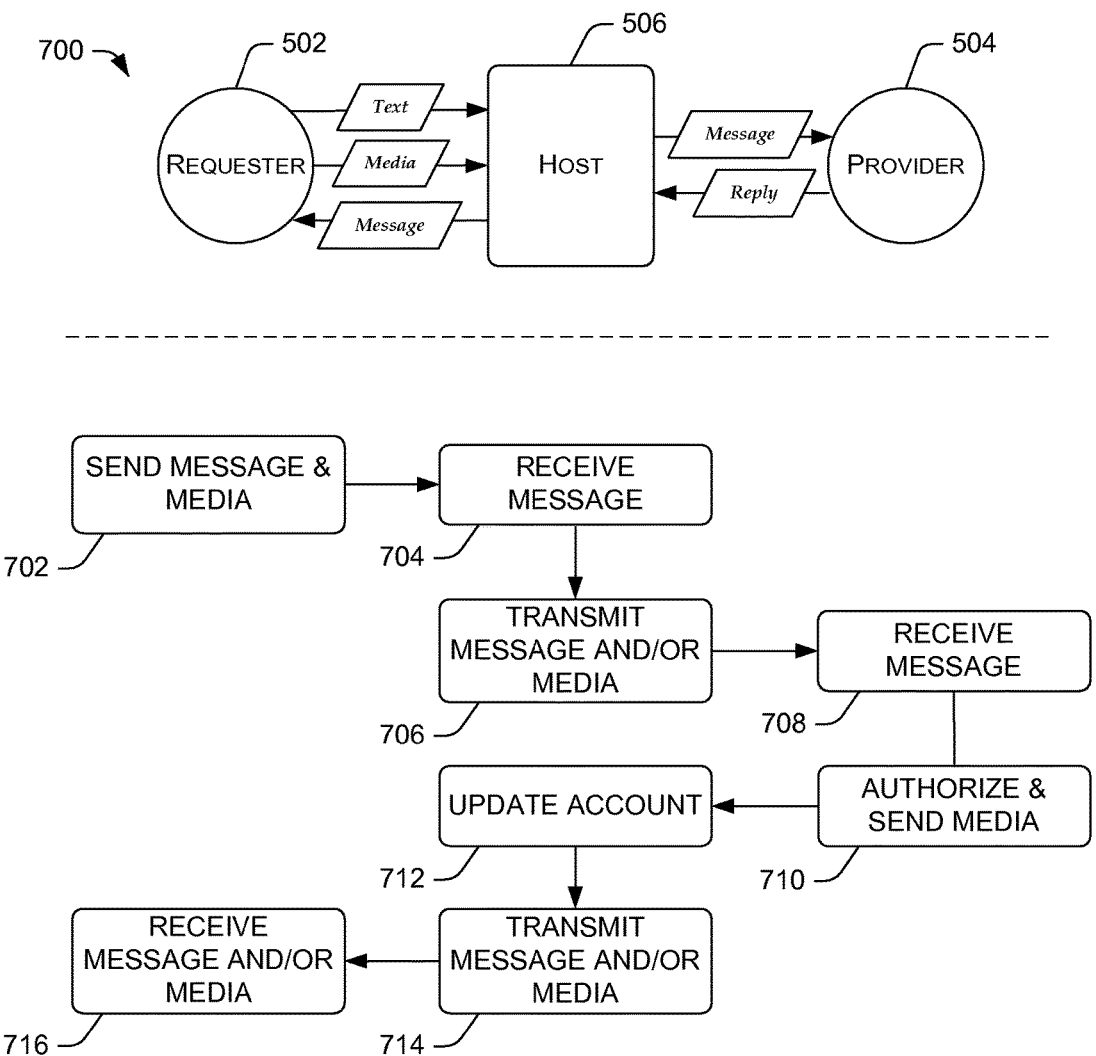
FIG. 7 shows an illustrative flow diagram of a process of a requester transmitting a request and media to a provider that may authorize the request to update an account.

FIG. 7 shows an illustrative flow diagram of a process 700 of a requester transmitting a request and media to a provider that may authorize the request to update an account. As discussed above with reference to the process 300, any number of the described blocks can be combined in any order and/or in parallel to implement the process 700. The descriptions, examples, and other support found in the process 400 may equally apply to some of the similar operations of the process 700, particularly the operation of process 700 including the same block titles as the operations in the process 400 such as the operations 402 and 702, which both have block titles that state "send message and media."

At 702, the requester 502 may send a message and media, which may be received by the host 506 at 704. At 706, the host 506 may transmit the message and/or media, or a portion of the message and media, to the provider 504. The provider may receive the message at 708 (i.e., the request). At 710, the provider 504 may authorize and send the media to the host 506. The process 710 may be similar to the authorization 520 of FIG. 5 whereas the authorization may include a second communication to confirm an action of the provider 504. The authorization at the operation 710 may include all or a portion of the information of the message of the operation 702 or other messaging.

At 712, the host 506 updates an account (e.g., the user account 510) associated with requester 502 and/or the provider 504. The host 506 may transmit the message and media, or a portion thereof, received at the operation 704 or the operation 710 to the requester at 714. At 716, the requester 502 may receive the message and/or media, or a portion of the message and/or media.

Additional Media Enhanced Mobile Payments Messaging

Figure 8:
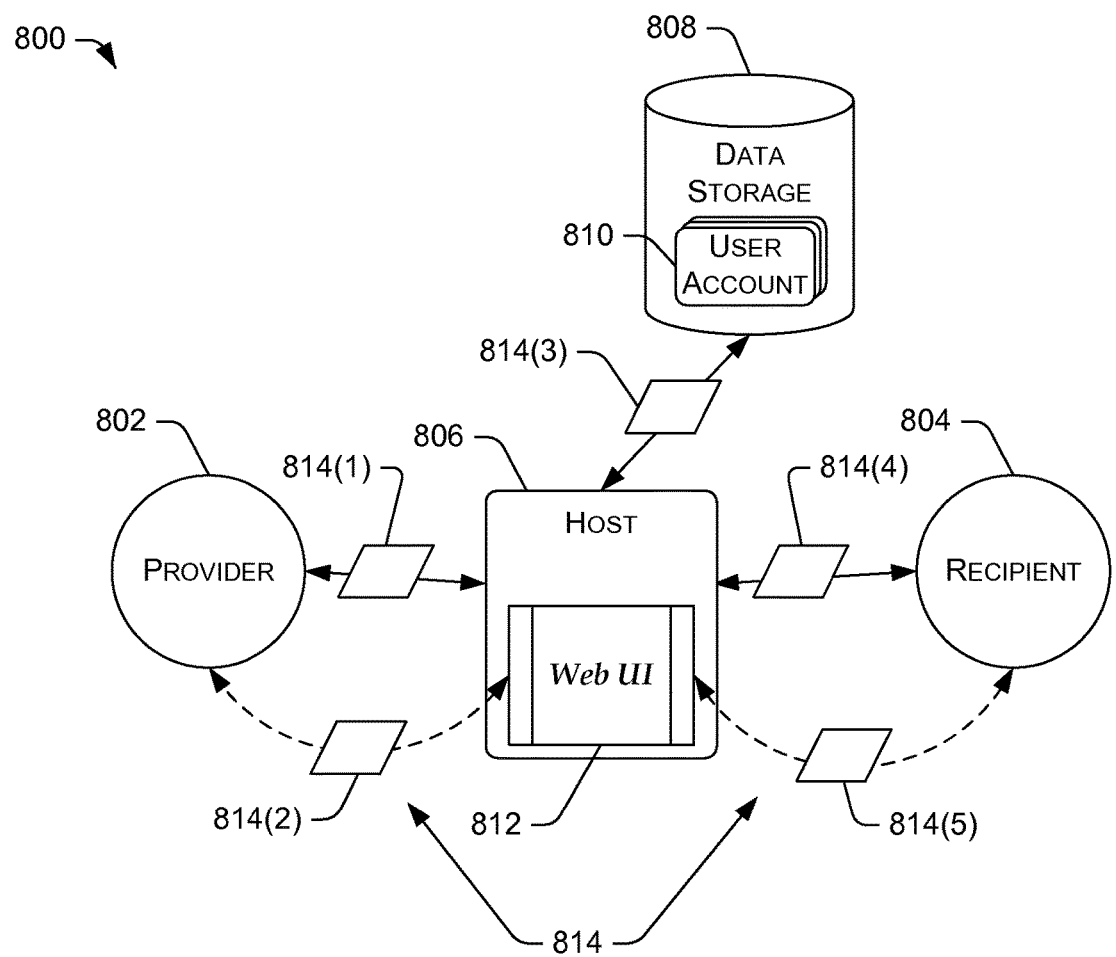
FIG. 8 shows an illustrative schematic of a media enhanced mobile payment including messaging and a web interface in accordance with some embodiments of the disclosure.

FIG. 8 shows an illustrative schematic of a media enhanced mobile payment web service ("web service") 800. The web service 800 includes messaging between a provider 802 and a recipient (or requester) 804 via a host 806. The host 806 may be in communication with a data storage 808, which may be used to maintain user accounts 810. In addition, the host 806 may include a web interface 812 that may facilitate communications between the provider 802, the recipient 804, and the host 806. The web service 800 may facilitate communications by transmitting various messages 814, or a portion thereof, to enable messaging as disclosed in the process 300 and the process 400. In addition or the alternative, the web service 800 may facilitate communications by transmitting the various messages 814, or a portion thereof, to enable requests as disclosed in the process 600 and the process 700.

The various messages 814 may include the messages 814(1), . . . , 814(5), which may include messaging (e.g., text messages, etc.) and additional media (e.g., audio, video, images, etc.). At least a portion of the various messages 814 may originate or be transmitted via the web interface 812. For example, the provider may log into a secure website provided by the host 806. The secure website may include a web interface that enables the provider 802 (or the recipient 804) to read or write messages and create, attach, view, play, or otherwise interact with additional media.

Figure 9A:
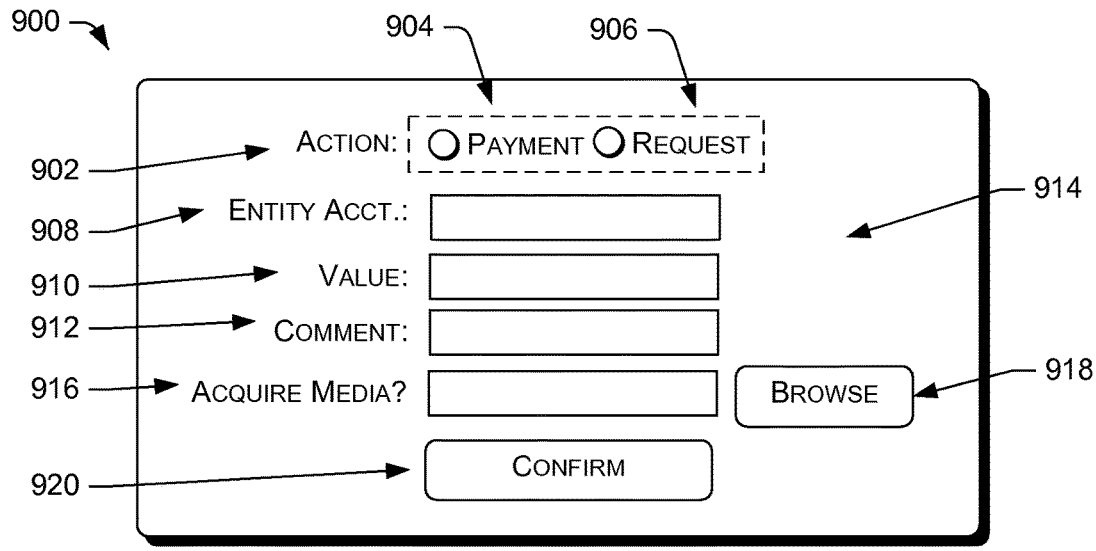
FIGS. 9A and 9B show illustrative web user interfaces (UIs), where
Figure 9B:
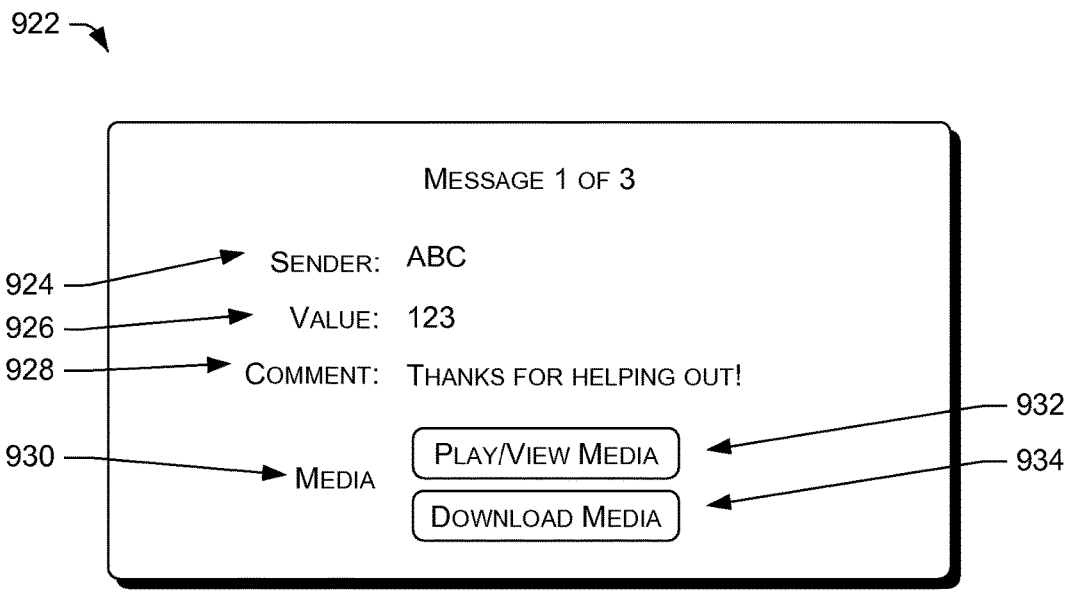

FIGS. 9A and 9B show illustrative web user interfaces (UI). In some embodiments, the UI's may be the web interface 812 provided by the host 806 of FIG. 8. Users, such as a provider, recipient, or requester may access the UIs via a secure or unsecure web page, for example, to perform payments and/or requests, or a portion thereof, as disclosed herein.

FIG. 9A shows a UI 900 to enable sending or requesting a payment that includes a media acquisition link. The UI 900 may include an action selector 902 that enables a user to send a payment via a payment selector 904 or send a request via a request selector 906. The UI 900 may include an entity account field 908 to enter the destination entity. The destination entity may be specified in the entity account field 908 by an email address, a telephone number, a user identification, an alias, or any other identifier sufficient to identify the destination entity. A value field 910 may be used to input the payment, such as by providing a number of units, currency, elements, or other value. In some embodiments, a comment field 912 may allow the user to add additional text to a payment or request. The entity account field 908, the value field 910, and the comment field 912 are included in a message portion 914 of the payment or request, and may be limited, in some embodiments, to text based information which may be transmitted via a SMS message or other communication.

In accordance with one or more embodiments, a media acquisition field 916 may enable the user to select media for transmission with the message portion. The upload media field 916 may include a browse button 918 to enable locating media, which may be attached or uploaded to the host 806 for distribution to another party (e.g., the provider, recipient, or requester). Finally, a confirmation button 920 may enable the user to transmit the information entered in the UI 900.

FIG. 9B shows an UI 922 of a message including a media link. The UI 922 includes a sender field 924, a value field 926, and a comment field 928, which may correspond to information entered in the UI 900 in the entity account field 908, the value field 910, and the comment field 912, respectively. A media link 930 may enable a user to obtain any additional media that may be transmitted to the user, such as media acquired via the UI 900 at the media acquisition field 916. A play/view media button 932 may enable the user to access an audio file, video file, or an image file. In addition, a download media button 934 may enable the user to download the additional media.

The UI 900 and the UI 922 may be used to interact with other communication paths and thus are not exclusively used together. For example, a recipient may use the UI 922 to view a payment message from a provider that transmits a SMS text message and obtain an audio recording of a personal message from the provider via a telephone service.

Illustrative Computing System

Figure 10:
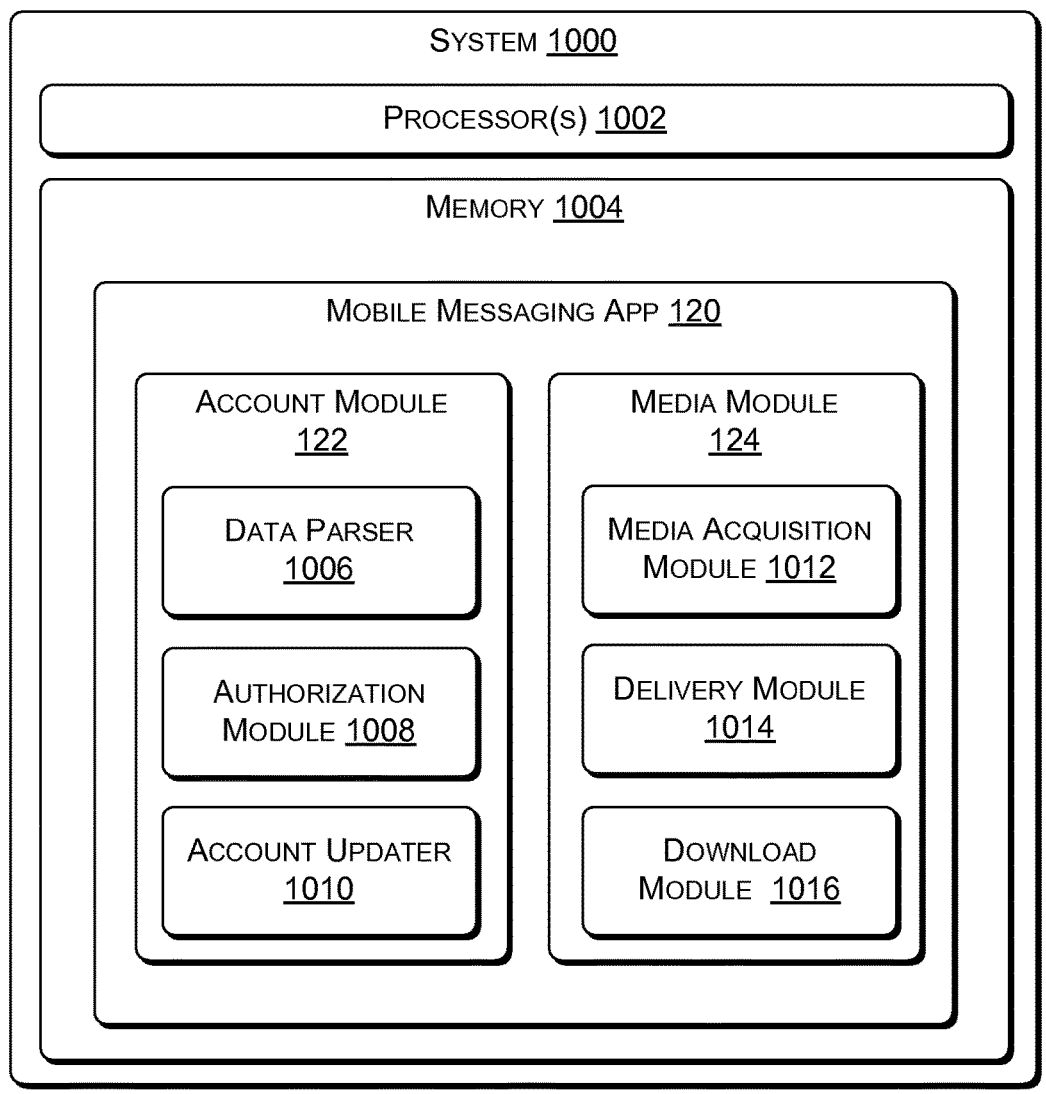
FIG. 10 shows a computing system illustrating one or more embodiments of components associated with the computing environment of FIG. 1.

FIG. 10 shows a computing system 1000 illustrating one or more embodiments of components associated with the computing environment of FIG. 1. The system 1000 may include one or more processors 1002 which may execute computer instructions stored in memory 1004. The memory 1004 may include the mobile messaging application 120, as described in FIG. 1, which may further include the account module 122 and the media module 124, each described in turn.

The account module 122 may include additional modules that facilitate at least a portion of the payments and/or requests as disclosed herein. A data parser 1006 may receive a message from a user and parse the message to extract instructions from the message. For example a message may be a string of characters which includes a command (e.g., pay, request, etc.), a value (e.g., 50, ten, 10:30 pm, etc.) and a comment. The data parser 1006 may implement predetermined logic to extract the values from the string of characters and the command.

The authorization module 1008 may be used to authorize a payment or a request, such as to facilitate the confirmation of the operations 306-310 of FIG. 3, the authorization 520 of FIG. 5, and so forth. For example, the authorization module 1008 may use a second communication path to interact with the provider, recipient, or requester, or another entity after at least one of a payment or a request, such as when a first communication path is an unsecure communication (e.g., an SMS message, etc.).

The account updater 1010 may update a user account such as the user accounts 210, 510, and 810. For example, the account updater 1010 may use the parsed message data resulting from the data parser 1006 to update user accounts based on the message. A provider may have an associated account deducted by the payment value while a recipient or requester may have an associated account increased by the payment (or requested) amount. In addition, other information may be updated by the account updater 1010 such as transaction details, authorization information, and so forth.

The media module 124 may include additional modules that facilitate transmission of additional media as disclosed herein. A media acquisition module 1012 may enable recording, uploading, or other acquisition of additional media. For example, the upload module 1012 may enable a user to record a personal message during a telephone call. The media acquisition module 1012 may also enable the user to acquire audio files, video files, and image files, among other types of additional media.

A delivery module 1014 may transmit the additional media obtained by the media acquisition module 1012 to the destination. For example, media acquired by the provider may be obtained by the delivery module 1014. The delivery module 1014 may transmit the media using the same or similar communication path that was used to obtain the media, or the delivery module may use a second communication path. In some embodiments, the delivery module 1014 may select the communication path to maximize a preferred attribute, such as to expedite delivery, reduce cost, increase dependability of receipt, and so forth. For example, the delivery module 1014 may detect that a recipient is unable to receive an MMS message, and may instead transmit a SMS message to the recipient followed by a telephone call to play a personalized voice recording.

A download module 1016 may enable a recipient, requester, or provider to download the additional media or play the additional media. For example, the download module 1016 may provide the additional media when a user selects the play/view media button 932 or the download media 934 of FIG. 9B. In some embodiments, the download module 1016 may enable streaming of media, such as audio or video files.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:
receiving, by one or more computing devices, from a first device associated with a provider and via a communication path, a payment message that specifies a recipient and an action to be performed, the action comprising providing a payment to the recipient;
determining, by the one or more computing devices, that an identity of the provider requires authorization based at least in part on the communication path;
causing, by the one or more computing devices, interaction with a host via an automated interactive voice response system to:
 receive, from the provider, authorization data that verifies the identity of the provider, and
 record an audio message for the recipient;
verifying the identity of the provider and authorizing the action based on the received authorization data;
linking the audio message to the payment message by designating the audio message with an identification (ID) number matching an ID number associated with the payment message; and
in response to verifying the identity of the provider:
 causing, by the one or more computing devices, a user account of the recipient to be updated based on the action, and
 transmitting, by the one or more computing devices, the audio message and an indication of the payment message to a second device associated with the recipient based at least in part on the ID number.

2. The method as recited in claim 1, further comprising:
identifying the communication path as a short message service (SMS) text message communication path; and
wherein determining that the identity of the provider requires verification is based at least in part on determining that the SMS text message communication path is an unsecure communication path.

3. The method as recited in claim 1, wherein transmitting the indication of the payment message and the audio message further comprises:
transmitting the indication of the payment message to the second device via a short message service text message; and
transmitting a data file that includes the audio message to the recipient by placing a telephone call to the second device to playback the audio message.

4. The method of claim 1, wherein transmitting the audio message to the second device further comprises:
sending a multimedia messaging service (MMS) message to the second device that includes the audio message and an indication of the action requested by the provider.

5. A method, comprising:
receiving, by one or more computing devices, via a first communication path, a payment transaction message from a first device associated with a provider, the payment transaction message including a payment instruction and additional media, the additional media including an audio recording and an additional instruction;
receiving, by the one or more computing devices, via a second communication path, an authorization message from the first device, the second communication path being different than the first communication path;
updating, by the one or more computing devices, an account associated with a recipient of the payment transaction message based on the payment instruction and the authorization message;

transmitting, by the one or more computing devices, an indication of the payment instruction, and an indication of the additional instruction via a third communication path to a second device associated with the recipient;

selecting, by the one or more computing devices, a fourth communication path to transmit the audio recording to the second device, the fourth communication path being different from the third communication path; and transmitting, by the one or more computing devices and via the fourth communication path, the audio recording to the second device.

6. The method as recited in claim 5, wherein the payment transaction message is at least one of a short message service (SMS) text message, a multimedia messaging service (MMS) message, an email, or a web interface communication.

7. The method as recited in claim 5, wherein the additional media further includes a video recording that is received from the first device in a first media format, the method further comprising:

converting the first media format to a second media format that is compatible with the second device.

8. The method as recited in claim 5, further comprising converting a first format of the payment transaction message to a second format, and transmitting, by the one or more computing devices, the second format of the payment transaction message to the second device.

9. The method as recited in claim 5, wherein the additional instruction is a request to make at least one of a restaurant reservation, a rental car reservation, or a hotel room reservation.

10. The method as recited in claim 5, wherein the communication path used for receiving the additional media is different than the first communication path.

11. The method as recited in claim 5, further comprising initiating, by the one or more computing devices, an authorization request to the first device to confirm the payment instruction.

12. The method as recited in claim 11, further comprising:

receiving, by the one or more computing devices, an authorization message from the first device indicating a payment amount in response to the authorization request, and causing, by the one or more computing devices, an update to the account associated with the recipient by the payment amount indicated on the authorization message.

13. A payment method, comprising:

receiving from a first device associated with a provider, a first text-based message over a first communication path, the first text-based message specifying at least an entity account of a recipient and a payment value;

determining, that an identity of a user of the first device requires verification based at least in part on the first communication path;

verifying the identity of the user of the first device using a second communication path, the second communication path different than the first communication path;

sending, to the first device, a cue to record a media content for the recipient, the media content including at least an audio recording;

receiving, from the first device, the media responsive to sending the cue to record the media content;

linking the media content to the first text-based message by designating the media content with an identification (ID) number matching an ID number associated with the first text-based message; and transmitting, to a second device, a second text-based message and the media content linked to the first text-based message, the second text-based message including at least an indication of the payment value and an identity of the provider.

14. The payment method as recited in claim 13, wherein the cue to record the media content includes sending the cue using an integrated voice messaging service.

15. The payment method as recited in claim 13, wherein transmitting the media content to the second device includes transmitting at least a portion of the media content responsive to button selection from a web-based user interface displayed by the second device.

16. The payment method as recited in claim 13, wherein the first text-based message includes an indication of a payment transfer that involves at least one of money or credits.

17. The payment method as recited in claim 13, wherein the media content further includes at least one of a video recording or an image.

18. One or more non-transitory computer-readable media storing computer-executable instructions that, when executed on one or more processors, performs acts comprising:

receiving, on a first communication path, a text message from a first device associated with a user that includes a request for a payment transaction with a recipient;

determining, by the one or more computing devices, that an identity of the user requires verification based at least in part on first the communication path;

causing, based on determining that an identify of the provider requires verification, the first device to provide, via a second communication path, data that verifies the identity of the user;

receiving a personalized audio or video media recording associated with the request for the payment transaction;

linking the personalized audio or video media to the text message by designating the personalized audio or video media with an identification (ID) number matching an ID number associated with the text message;

updating a recipient account based on contents of the request for the payment transaction; and transmitting the personalized audio or video media recording and an indication of the payment transaction to a second device associated with the recipient based at least in part on the ID number, wherein the second communication path differs from the first communication path.

19. The one or more non-transitory computer-readable media as recited in claim 18, wherein the request for the payment transaction is received via a first communication, and wherein the personalized audio or video media recording is received via a second communication.

20. The one or more non-transitory computer-readable media as recited in claim 18, wherein receiving the request for the payment transaction includes receiving a short message service (SMS) text message that includes an indication of at least an entity account, a transaction request command, and a transaction request value.

21. The one or more non-transitory computer-readable media as recited in claim 18, the acts further comprising transmitting an authorization request to the first device, the authorization request including a selectable option for the user to record the personalized audio or video media recording.

22. A system, comprising:
memory;
one or more processors; and
one or more computer-executable instructions stored in the memory and executable by the one or more processors to:
- receive, via a first communication path, a request from a first device associated with a user for a mobile payment specifying at least a recipient, a payment command, a payment value, and a recipient account;
- verifying identity of the user via a second communication path, wherein the first communication path and the second communication path differ; and
- when the identity of the user is verified via the second communication path:
  - record a personalized audio or video message from the first device,
  - link the personalized audio or video message to the request by designating the personalized audio or video message with an identification (ID) number matching an ID number associated with the request,
  - cause a value of the recipient account to be adjusted based at least in part on the payment command and the payment value, and
  - transmit an indication and the personalized audio or video message to a second device associated with the recipient, based at least in part on the ID number, the indication including at least the payment command and the payment value.

23. The system as recited in claim 22, wherein the request is received from the first device associated with the user as a short message service (SMS) text message having predefined payment commands.

24. The system as recited in claim 22, wherein the one or more computer-executable instructions are further executable by the one or more processors to:
- parse the request from the first device to identify the payment command, the payment value, the recipient account, and one or more additional transaction requests, wherein the one or more additional transaction requests comprise a request for additional elements from the recipient.

25. The system as recited in claim 22, wherein the personalized audio or video message from the first device is in a first media format, and wherein the one or more computer-executable instructions are further executable by the one or more processors to:
- convert the first media format to a second media format that is compatible with the second device.

* * * * *